June 5, 1956 J. F. HOUDEK, JR 2,749,388

AUTOMATIC INTERCOMMUNICATION TELEPHONE SYSTEM

Filed April 12, 1952 3 Sheets-Sheet 1

INVENTOR:
JOSEPH F. HOUDEK JR.
BY John I. Bellamy
ATTORNEY

June 5, 1956 J. F. HOUDEK, JR 2,749,388

AUTOMATIC INTERCOMMUNICATION TELEPHONE SYSTEM

Filed April 12, 1952 3 Sheets-Sheet 2

INVENTOR:
JOSEPH F. HOUDEK JR.
BY John I. Bellamy
ATTORNEY

June 5, 1956 J. F. HOUDEK, JR 2,749,388

AUTOMATIC INTERCOMMUNICATION TELEPHONE SYSTEM

Filed April 12, 1952 3 Sheets-Sheet 3

INVENTOR:
JOSEPH F. HOUDEK JR.
BY John J. Bellamy
ATTORNEY

United States Patent Office 2,749,388
Patented June 5, 1956

2,749,388

AUTOMATIC INTERCOMMUNICATION TELEPHONE SYSTEM

Joseph F. Houdek, Jr., Elmhurst, Ill., assignor to International Telephone and Telegraph Corporation, a corporation of Maryland Application April 12, 1952, Serial No. 281,997
8 Claims. (Cl. 179—20)

This invention relates to an automatic intercommunicating telephone system, and more particularly to a telephone system of that type which is adapted to provide economical and efficient service over relatively short lines, those for example, encountered within a single establishment.

The principal object of the invention is to provide an improved and more reliable arrangement for ensuring privacy of communication over connected lines where each line is provided with an individual selecting mechanism and associated control apparatus for connecting such line to any desired other line of the system, and where the called line is tested directly to determine its busy or idle condition, rather than being tested over a separate local wire.

I. GENERAL DESCRIPTION

It has been chosen to illustrate the invention as applied to a local or private automatic telephone system of the general type shown in Patent No. 2,213,933, issued on September 3, 1940, to T. N. Saaty, and employing individual selectors of the general type shown in Patent No. 1,265,398, issued on May 7, 1918, to A. E. Stevens.

In a system of the foregoing type, while each individual line employs more than one wire (usually three), the connection from one line to another is only a single-wire connection, made through the single brush of the concerned selector. This arrangement has proved to be quite satisfactory for the short distances and low wire resistances usually involved within private establishments.

Since the simple system under discussion uses a separate individual selector for each line rather than employing a percentage trunking arrangement, the selector mechanisms and associated individual control-relay apparatus must remain simple and economical in order that the cost per line remain relatively low. For example, push-button ringing is employed, for the relay apparatus per line that would be required to provide automatic ringing, and ring-tripping upon answer, would render the per-line cost prohibitive.

One specific feature of the invention resides in a simple arrangement (of which three embodiments are shown) of each individual selector to insure that a premature operation of the ringing push button at the calling telephone will not render ineffective the means for barring connection to a called line which is busy.

Another specific feature relates to the provision of a new and improved executive type of station, having a simplified and more economical arrangement for automatically sending the required number of stepping impulses to the switchboard responsive to the operation of any one of a number of push buttons corresponding respectively to desired lines of the system.

Other objects and features will appear from the description hereinafter given.

IA. *The drawings*

Referring now to the accompanying drawings comprising Figs. 1 to 4, they show (largely in circuit diagram) sufficient apparatus of a system embodying the invention to enable the invention to be understood;

IB. *The system*

Figure 1:
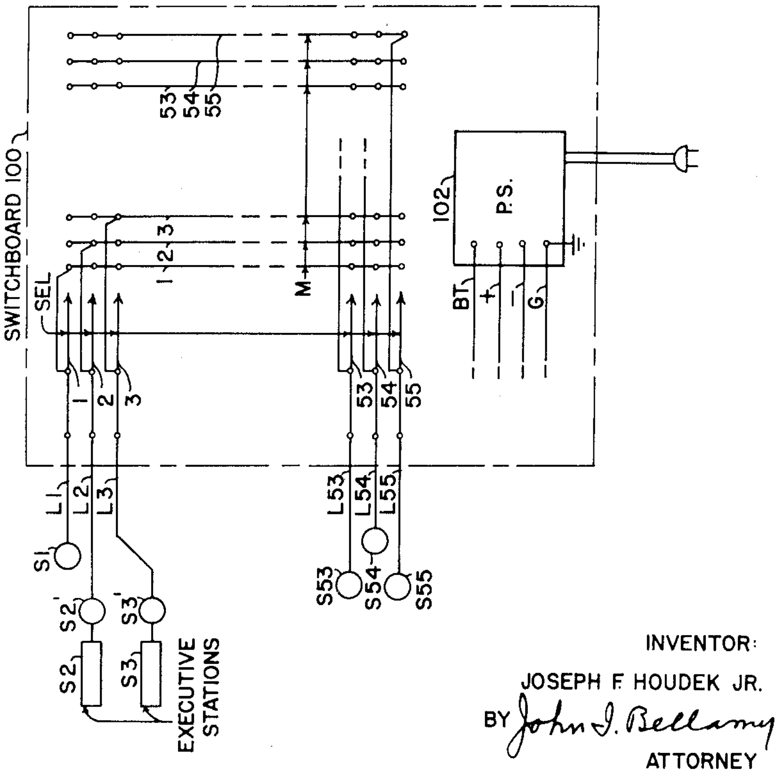
Fig. 1 shows the system in single-line diagram.

Fig. 1, a single-line diagram, shows a system according to the present invention serving fifty-five lines L1 to L55, and their respective stations S1 to S55. Lines L1 to L55 are connected at the switchboard 100 to respective selectors SEL–1 to SEL–55, as well as to corresponding multiple conductors 1 to 55 to which the selectors have common access. Thus, any calling line can be connected directly to any other line of the system by appropriately positioning the individual selector SEL of the calling line.

The stations of the system are of two types, comprising executive stations and regular stations, represented in Fig. 1 by rectangles, and by circles, respectively. Each executive station (such as S2 or preferably S3) has associated therewith a modified regular station (such as S2′ or S3′) connected to the same line.

Switchboard 100 includes a power-supply unit 102, which is designed to operate from a conventional power source to provide busy-tone, positive, negative, and ground potentials to respective common conductors BT, +, —, and G.

Figure 2:
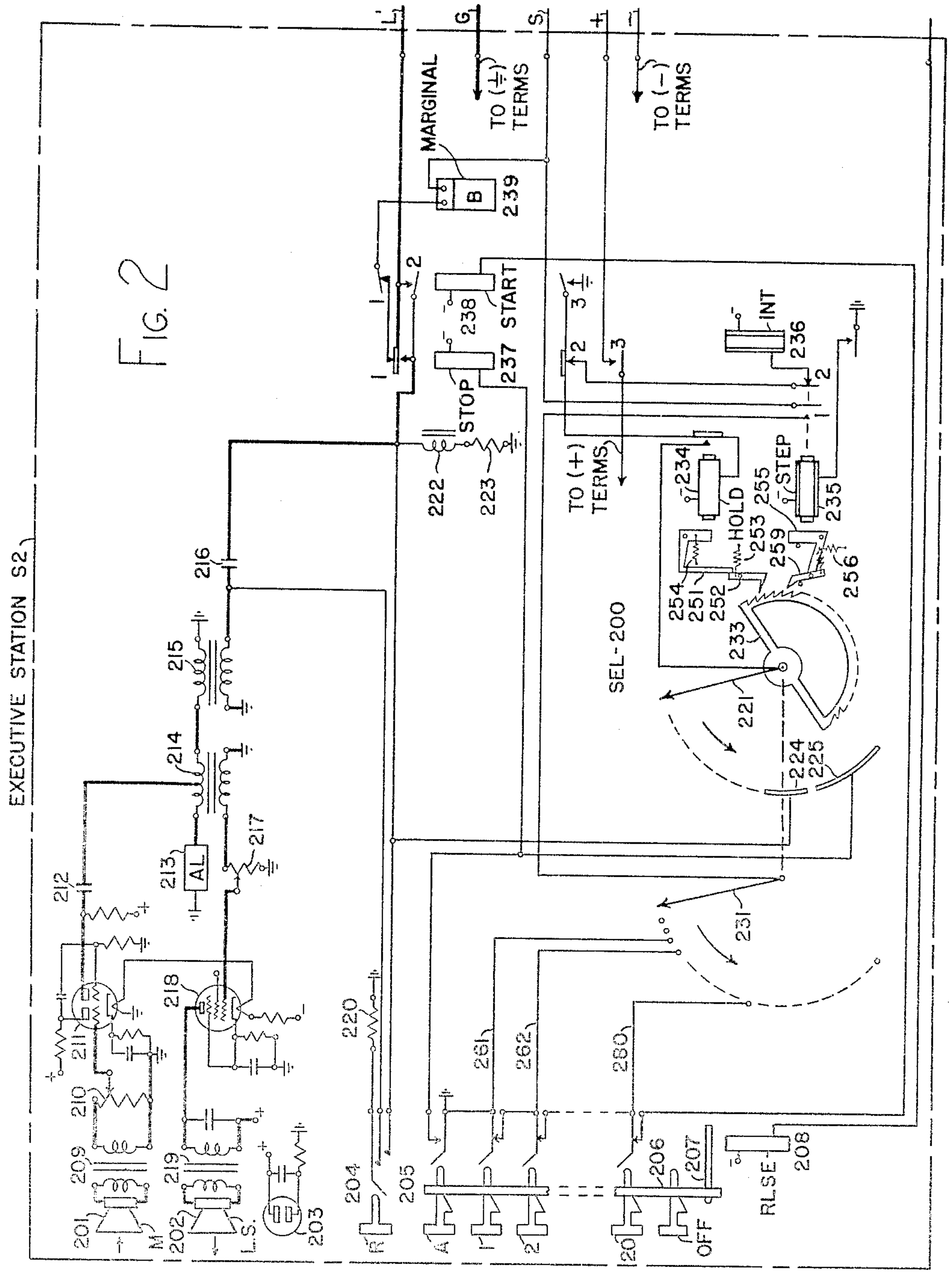
Figs. 2 and 3 show in circuit diagram a portion of the apparatus of Fig. 1.
Figure 3:
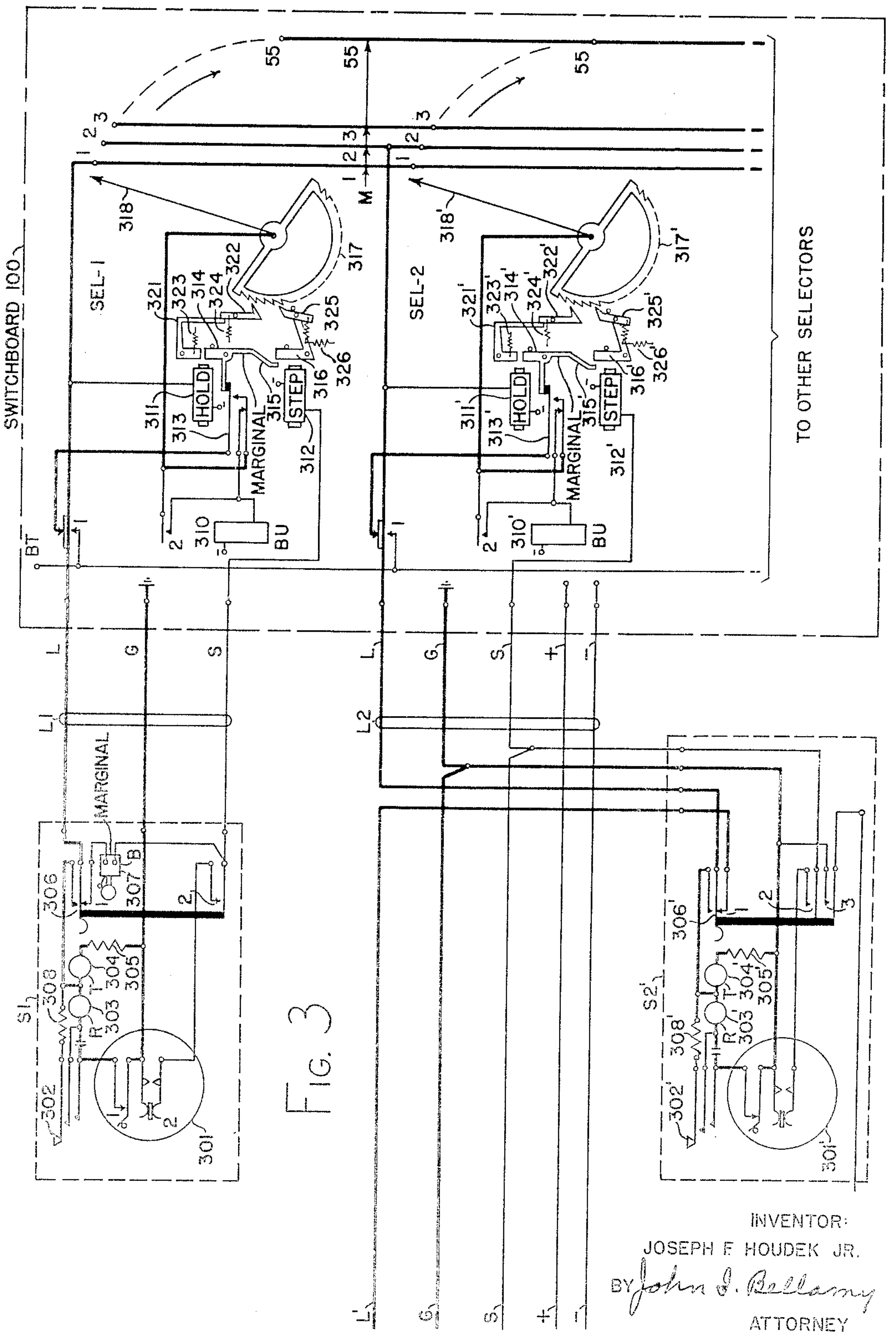

Referring now to Figs. 2 and 3, which show a circuit diagram of the system of Fig. 1, regular station S1 is served by the three-conductor line L1. This station includes signal buzzer 307 (serving the purpose of the usual telephone ringer), transmitter 304, receiver 303, dial type calling device 301, a ringing push button 302, and hookswitch 306.

The auxiliary station S2′ (Fig. 3) associated with executive station S2 (Fig. 2) on line L2, is a suitably modified version of the regular station S1.

Executive station S2 (Fig. 2), is served by the five-conductor line L2. This station is of the loudspeaking type, and therefore includes a microphone pickup unit 201 and a similar loud-speaker unit 202 connected to respective amplifiers. In place of the conventional dial, the executive station is equipped with a push-button calling device comprising buttons 1 to 20 of device 205, together with a stepping selector SEL–200 and associated relays. Device 205 also includes an answer key A and a disconnect key "Off" which cooperate with keys 1 to 20 in controlling the line in lieu of the usual hookswitch. Station S2 also includes a ringing push button 204 and a signal buzzer 239.

Selector units SEL–1 and SEL–2 of lines L1 and L2 are shown diagrammatically in Fig. 3. These selector units are all alike, and are mechanically of the general type is closed in the noted A. E. Stevens patent. Selector unit SEL–1, for example, includes a brush 318 and control rack 317, stepping magnet 312, hold magnet 311, and busy-test relay 310. Selector SEL–1 also includes a spring or other means (not shown) for returning brush 318 and rack 317 to their illustrated normal position after use.

II. DETAILED DESCRIPTION

The system having been described generally, a detailed description of its operation will now be given.

IIA. *Line L1 calls line L2*

The party at station S1 on line L1, to call the party at station S2′ on line L2, removes receiver 303 and dials the directory number (2) of line 12.

When receiver 303 is removed, make contacts 1 of hookswitch 306 connect line conductor L to the ground on line conductor G, through transmitter 304 and limiting resistor 305, thereby applying a guarding ground potential to the corresponding multiple conductor M1 at the switchboard. Current now flows through the winding of the battery-connected hold magnet 311 to ground through substation S1, energizing transmitter 304.

Hold magnet 311 has two armatures—a sensitive armature 321, and a marginal armature 314. The current flow is so limited by resistor 305 and transmitter 304 that marginal armature 314 cannot operate. Sensitive armature 321 operates against the light tension of its restoring spring 323, releasing latch 322, which is moved by its light spring 324 into effective holding engagement with the teeth of rack 317, thereby preparing selector SEL-1 for operation.

When the subscriber at calling station S1 on line L1 operates his calling device 301 to transmit pulses (2) representing the directory number of called line L1, its off-normal contacts 1 open to disconnect ringing button 302 from grounded conductor G during dialing. On the usual return movement of calling device 301, its normally open impulse-generating contacts close momentarily a number of times (2) depending on the value of the digit dialed. On each closure of contacts 2 of device 301, an impulse is transmitted from ground on wire G, through contacts 2 of hookswitch 306 and over conductor S to the battery-connected winding of stepping magnet 312. Stepping magnet 312 operates its armature 316 against the tension of restoring spring 326 responsive to each impulse transmitted thereto over wire S. Each time armature 316 is operated, its pawl 325 engages the associated tooth to advance rack 317 and brush 318 one step. Brush 318 is thereby caused to move from its illustrated normal position into engagement with the associated bank contacts successively, thereby reaching the switchboard multiple wire (M2) corresponding to the digit dialed. Brush 318 is held in any advanced position by the engagement of latch 322 with the teeth of rack 317.

If the called line L2 is busy when called, there is a guarding ground potential on the multiple wire M2 thereof as explained for wire M1 of the calling line. Consequently, the battery-connected sensitive busy relay 310 of the selector SEL-1 operates through the normally closed contacts 313 controlled by marginal armature 314 of hold magnet 311, and through brush 318 as soon as the brush makes contact with the called line.

Upon operating, relay 310 disconnects conductor L of line L1 from its association with brush 318 and connects the line wire to the busy-tone wire BT, thereby informing the calling party that the called line is busy. At its contacts 2, relay 310 locks itself directly to brush 318 to maintain the busy relay connected notwithstanding an operation of armature 314 in the event the busy signal is ignored. Connection with the busy called line is thus positively denied.

If the called line is idle when called, busy relay 310 fails to operate, and busy relay 310 restores when a called busy line becomes idle if the calling party cares to wait for that occurrence. In either event, the absence of a busy-tone, indicates that operation of the ringing button 302 to signal the called station is in order.

When ringing button 302 is depressed, the two uppermost elements thereof first shunt resistor 308 around receiver 303 to lower the sensitivity thereof, and then the three elements of 302 on closing together, extend ground potential to line conductor L from line conductor G, through the closed off-normal contacts 1 of calling device 301, and through low-resistance resistor 308, thereby substantially short-circuiting transmitter 304 and resistor 305. Conductor L of line L1 is thereby brought substantially to ground potential, thereby sharply increasing the current flow through hold magnet 311. Marginal armature 314 now operates against the tension of its contact spring 313, thereby so shortening its magnetic circuit that it remains operated after button 302 is restored. Spring 313, with relay 310 in restored condition, connects line conductor L, through the associated contact spring and brush 318, to line wire L of line L2 over multiple conductor M2 with which the called line L2 is associated.

The ground now on the calling line (through button 302) thus appears on conductor L of line L2. Hold magnet 311′ is fully energized, thereby actuating both armatures 321′ and 315′, but this result is purely incidental. The fully grounded condition of conductor L of called line L2 causes the marginal buzzer 239 to operate at station S2, it being connected to wire L of line L2 through contacts 1 of relays 237 and 238 and through contacts of hookswitch 306′ of set S2′, and it being connected to battery over wire S of line L2, through magnet 312′. Magnet 312′ is not operated because of the high impedance of buzzer 239. The usual interrupter action of buzzer 239 causes the current over wire L of the calling line to undulate, whereby a mild buzzing tone is produced at receiver 303 as it is not completely shunted by resistor 308.

When button 302 is released, the potential on wire L of the established connection departs from ground potential, whereby the marginal buzzer 239 ceases operating, but both armatures of each of the hold magnets 311 and 311′ are held operated by the reduced current flow.

The calling party may signal but a single time if desired, or he may signal repeatedly at random, or according to any desired code, by suitably operating and restoring ringing button 302. Code-ringing multi-party lines may thus be used as desired.

The call on line L2 may be answered either at executive station S2 or at privacy station S2′. Assume that the call is answered at S2′. The removal of the receiver 303′ from hookswitch 306′ completes the talking connection. Transmitter 304 is connected between wires L and G of line L2, drawing transmitter current in parallel with that drawn by the calling station.

When both receivers are replaced on their respective subsets, the grounded conductors G of the called and calling lines are disconnected from their associated line conductors L by contacts 1 of the hookswitches, permitting both armatures of each hold magnet to be returned to their normal illustrated positions by their respective springs. The pawls associated with the armatures of the hold magnets are disengaged from the rack teeth and rack 317 and brush 318 of selector SEL-1 are returned to their illustrated positions by springs, not shown. Line L1 and L2 are now in readiness for originating or receiving another call.

When only one receiver is replaced on its subset, the grounded conductor G of the line associated with the other receiver, remains connected to line conductor L thereby maintaining both hold magnets in an operated condition until both receivers are replaced. This last party release arrangement is necessary to enable conference calls to be conducted and privacy handset calls to be transferred, as will be described hereinafter.

Selector SEL-1 is so arranged that if the calling device 301 is a conventional dial, a line with a directory number greater than 10 may be reached by dialing two or more digits. For example, assume line "19" is to be called, the calling party dials the digit "0," followed by the digit "9." Stepping magnet 312 operates responsive to the digit "0" and advances its brush 318 to switchboard multiple wire M10 (not shown). When the second digit "9" is dialed, the stepping magnet is again operated and advances brush 318 nine more steps to switchboard multiple M19 (not shown). The called line may then be signalled in the normal manner. This digit-adding arrangement of the selectors permits the use of a conventional dial or a special dial arranged to generate a number of pulses corresponding to the number of lines in the system.

IIA1. *Abnormal operation*

As hereinbefore pointed out, a feature of this invention resides in an arrangement for ensuring privacy of communication under abnormal operation. Heretofore, the inadvertent or malicious depressing of the ringing key, before or during dialing, disabled the busy relay and permitted connections to be established to busy lines.

The marginal armature of any hold magnet is actuated when an associated ringing button is depressed, and it remains actuated by a mild flow of current through the hold magnet winding after the ringing button is restored. The marginal armature has an extended portion so arranged that when the armature is actuated, its extended portion is disposed in the path of the stepping magnet armature. Therefore, the stepping magnet armature, when actuated while the marginal armature of the hold magnet is held actuated by a mild flow of current, will strike the extended portion of the marginal armature and restore it.

Under abnormal operation, the momentary depressing of the ringing button before dialing, will actuate the marginal armature of the associated hold magnet and disable the busy relay, but energization of the stepping magnet responsive to the operation of the calling device, causes the marginal armature to be restored and the disabled busy relay to be returned to its normal operating circuit for performance of its busy test function.

If the ringing button is held depressed in an attempt to overcome the restoration of the marginal armature of the hold magnet during dialing, off-normal contacts 1 of the associated calling device open the ringing circuit, and the marginal armature can readily be restored by the stepping magnet armature as it is now held actuated by a mild flow of current. Therefore, the busy relay cannot be disabled by abnormal operation and privacy of conversation is assured.

This arrangement wherein the stepping magnet armature will strike the operated marginal armature of the hold magnet and restore it, permits the hereinbefore noted digit-additive dialing even though the ringing button is depressed between digits.

IIB. *Line L2 calls line L1*

The operation of the system when line L2 calls line L1 from either the regular station S2′ or the executive station S2, will now be described.

IIB1. *Station S2′ calls line L1*

The party at station S2′ on line L2 may call line L1 in the manner described for line L1 calling line L2. The subsets and selectors are similar with the exception that the buzzer (307) as line L1 is located at regular station S1, as line L1 is not an executive station line. However, the energization of buzzer 307 at station S1 is similar to the energization of buzzer 239 at executive station S2.

IIB2. *Station S2 calls line L1*

The party at any executive station S2, to call another line, depresses the pushbutton corresponding to the desired line to be called and waits for the party at the called line to answer, as the ringing operation is fully automatic.

Assuming pushbutton "1," associated with line L1 is depressed, it is mechanically engaged and held in a depressed condition by retaining bar 206. Contacts of pushbutton "1" remove ground potential from the winding of normally operated start relay 238, restoring it. Contacts 1 and 2 of relay 238 transfer line conductor L′ from buzzer 239, to the microphone and loudspeaker amplifier circuits, and at its contacts 3, extend ground potential to the windings of interrupter relay 236 and hold magnet 234.

Contacts 2 of relay 238, in addition to connecting the amplifiers to line conductor L′, extend ground potential through resistor 223 and coil 222 to line conductor L1 and thence to the battery-connected winding of hold magnet 311′ of selector unit SEL–2. Ground potential on line conductor L1 applies a guarding ground potential to the associated multiple conductor M2 of the switchboard. Current flow through the winding of magnet 311′ is so limited by resistor 223 and coil 222 that marginal armature 314′ cannot operate. Sensitive armature 321′ is actuated against the light tension of its restoring spring 323′ and releases latch 322′, which is moved by its light-tension spring 324′ into effective holding engagement with the teeth of rack 317′, thereby preparing selector SEL–2 for operation.

Hold magnet 234 operates from the ground at contacts 3 of relay 238 and at its contacts, extend its operating ground to brush 221 of selector SEL–200 in preparation for automatically signalling the desired called station at the proper time. Armature 251 of magnet 234 is actuated against the light tension of its restoring spring 254 and releases latch 252, which is moved by its light tension spring 253 into effective holding engagement with the teeth of rack 233, thereby preparing selector SEL–200 for operation.

Interrupter relay 236 operates from the ground at break contacts 3 of now restored start relay 238 and at its contacts extend ground to the winding of stepping magnet 235, operating it. Contacts 2 of magnet 235 opens the operate circuit of the interrupter relay, which restores a short time later to restore stepping magnet 235. With the restoration of magnet 235, the operate circuit of the interrupter relay is again closed and the sequential operation and restoration of relay 236 and magnet 235 is repeated. This cycle of interrupter relay and stepping magnet operation and restoration continues until stop relay 237 operates, to open the operate circuit of interrupter relay 235.

With each impulse transmitted to the battery-connected winding of stepping magnet 235, from contacts of relay 236, stepping magnet 235 operates its armature 225 against the tension of restoring spring 256. Each time armature 225 is actuated, its pawl 259 engages the associated tooth to advance rack 233 and brushes 221 and 231, on step. Brushes 221 and 231 are thereby caused to move from their illustrated normal position into engagement with the switch contacts successively, thereby becoming successively connected with the contacts of pushbuttons 1 to 20 over their respective wires 261 to 280. After each step, brushes 221 and 231 are held in their advanced position by the engagement of latch 252 with the teeth of rack 233.

When all pushbuttons are in restored condition (as illustrated), ground is extended to the winding of start relay 238, holding it operated. Upon the depressing of one of the pushbuttons corresponding to a desired line, ground is removed from the winding of relay 238, as well as from each of the wires 261 to 281 which are associated with the pushbuttons following the one which was depressed. Thus, as brush 231 advances across the switch contacts associated with the wires 261 to 280, ground is extended thereover from each wire, up to and including, the wire corresponding to the pushbutton depressed. Brush 231 thereafter continues advancing but without contacting ground potential on the remaining wires.

Since the desired line called is assumed to be line L1, and pushbutton "1" of pushbutton assembly 205 is depressed, ground potential is removed from wires 262 to 281, which are associated with the remaining pushbuttons "2" to "20." Brush 231 of unit SEL–200, advancing across the switch contacts associated with wires 261 to 280, contacts ground on wire 261 and no others, and in conjunction with contacts 1 of stepping magnet 235, transmits one impulse to stepping magnet 321′ of selector SEL–2.

Stepping magnet 312′ operates its armature 316′ against the tension of restoring spring 326 responsive to the impulse transmitted thereto from brush 231 of selector SEL–200. Pawl 325′ engages the associated tooth to advance rack 317′ and brush 318′ one step. Brush 318′ is thereby caused to move from its illustrated normal position into engagement with the associated bank contact thereby reaching the switchboard multiple wire (M1) corresponding to the pushbutton depressed.

If the called line is busy when called, guarding ground potential is present on the multiple conductor associated with the called line and is extended over brush 318′ and through break contacts 313′ on hold magnet 311′ to the battery-connected winding of busy relay 310′, operating it. If the called line is idle, busy relay 310′ fails to operate and ringing potential may be applied to the called line.

Upon operating, busy relay 310′ disconnects conductor L of line L2 from its association with brush 318′ and connects the line wire to the busy-tone wire BT. At its contacts 2, relay 310′ locks itself to brush 318′ to maintain the busy relay connected when ringing potential is applied to the line conductor L of line L2.

As brush 231 of selector unit SEL–200 passes the last switch contact associated with the bushbuttons, grounded brush 221 makes contact with ringing bar 224 which is connected to line conductor L′ of line L2 through contacts on relay 238. This ground is extended to the battery-connected winding of hold magnet 311′ through break contacts 1 of hookswitch 306′ and over conductor L of called line L2. Hold magnet 311 of selector SEL–1 and hold magnet 311′ of selector SEL–2 are fully energized, thereby actuating the marginal armatures. The fully grounded condition of conductor L of called line L1 energizes marginal buzzer 307 to signal the called party, it being connected to line conductor L through back contacts 1 of hookswitch 306 and being connected to battery over wire S, through magnet 312. Magnet 312 does not operate because of the high impedance of buzzer 307. Buzzer 307 is energized as long as brush 221 is in contact with ringing bar 224 and may, for example, extend over a period of several interrupter cycles.

After advancing beyond ringing bar 224, responsive to the continued operation and restoration of stepping magnet 235, grounded brush 221 makes contact with stop bar 225 which is directly connected to the battery-connected winding of stop relay 237, thereby operating it. Contacts 2 of relay 237 open the operate circuit of interrupter relay 236, thereby stopping the advancement of stepping relay 235. Contacts 3 extend positive battery potential to the amplifiers, preparing them for use. Contacts 2 close an additional path connecting the amplifiers to the line conductor L′ in preparation for the use of the privacy handset, if so desired. The calling party at station S2 awaits answer by the called party, or a busy-tone signal in the event that the called line is busy.

If the called line is busy, busy relay 310′ is operated as hereinbefore described, and its contacts 1 disconnect brush 318′ from line conductor L′ to prevent the ringing of the busy line. Busy-tone is returned to the calling party through the loudspeaker amplifier.

If the called party fails to answer responsive to the automatic ringing, an additional ring signal may be provided manually by depressing ring button 204 which applies ground through resistor 220 directly to conductor L′ of line L2. Thus, the line of the called party may be manually rung until answered.

When the called party answers, transmitter 304 being bridged across line conductors L and G, draws transmitter current and the talking connection is completed to line conductor L′ of line L2.

Voice signals from the calling party are fed to transformer 209 from transmitter 201 and then passed through volume control 210 to the first grid of the dual triod amplifier tube 211. The output of amplifier tube 211 is coupled by condenser 212 to the center-tapped transformer 214 and inductively coupled to line conductor L. The microphone output is divided at the transformer center-tap, by a balanced network including artificial line 213, to cancel any reproduction by the loudspeaker of signals from the microphone. The amplified signals from the microphone amplifier are transmitted to the called line over the connections established by brush 318′ of selector unit SEL–2.

Return signals from the called line after being transmitted over the connection established by selector unit SEL–2, are fed to impedance-matching transformer 215 through coupling condenser 216, and are inductively coupled to the grid of the cathode biased amplifier tube 218 through volume control potentiometer 217. The output of amplifier tube 218 is inductively coupled by transformer 219 to loudspeaker 202 which reproduces the transmitted signals. As noted, feed-back signals between loudspeaker 202 and microphone 201 are cancelled by the use of artificial line 213. An "On" indicating lamp 203, of the gaseous discharge type, is caused to glow as long as the amplifier circuits are energized by a positive potential.

When the conversation between the calling and called parties is completed, the called line disconnects by replacing receiver 303 on its hookswitch 306, and the calling party disconnects by depressing pushbutton "Off." The depressing of the "Off" button disengages any pushbutton from "1" to "20" which was held in a depressed condition. Ground potential is thereby reapplied to the battery-connected winding of start relay 238, operating it. Contacts 3 of relay 238 disconnect ground potential from the winding of hold relay 234, releasing it. The release of hold magnet 234 disengages pawl 252 thereby permitting brushes 221 and 231 to be returned to their normal illustrated position by a returning spring, not shown.

With brush 221 in its restored position, the operating and hold circuit of stop relay 237 is opened and it restores. Its contacts 3 remove the positive battery potential from the amplifiers, thereby returning them to normal condition. Contacts 1 disconnect the amplifiers from line conductor L′ and open the holding circuit of magnet 311′. Pawl 322′ is disengaged from rack 317′ and brush 318′ of selector unit SEL–2 is restored to its normal illustrated position by a returning spring, not shown. Lines L1 and L2 are now in an idle condition and in readiness for originating or answering another call.

IIB2*a*. *Station S2 answers a call*

When line L2 is called, buzzer 239 is energized as described and signals the called party. The call may be answered at executive station S2 by depressing answer pushbutton "A" of pushbutton assembly 205. Contacts of pushbutton "A" extend ground potential to the winding of stop relay 237, energizing it. As hereinbefore described, the operation of stop relay 237 disconnects buzzer 239 and causes the amplifier circuits to be energized and connected to the calling line. Conversation may be carried on with the calling party over the executive station unit as previously described.

Upon completion of the conversation, pushbutton "Off" of the pushbutton assembly 205 is depressed and disengages the answer button, thereby restoring stop relay 237 and returning the executive station apparatus to normal idle condition.

IIC. *Call transfer*

The operation of the system in transferring calls to and from the executive station S2 and the privacy station S2′ will now be described.

IIC1. *Station S2 transfers a call*

If a connection is established between executive station S2 on line L2 and another line, the call may be transferred from the loudspeaking unit to the privacy handset by merely lifting receiver 303′ of station S2′. Break contacts 1 of hookswitch 306′ transfer line conductor L from the amplifiers of executive station S2′ to the transmitter and receiver of station S2′. At the same time, the ground potential on conductor G at make contacts 3 of hookswitch 306′ is extended to the winding of release relay 208 of pushbutton assembly 205, thereby actuating release armature 207 to disengage any pushbutton which is held in depressed condition. With all pushbuttons restored, as hereinbefore pointed out, start relay 238 operates and returns selector SEL–200 to its inoperative condition. Executive station S2 is entirely disconnected from its associated line and conversation with the calling or called party may be carried on over the privacy handset at station S2′.

When the privacy handset is returned to its hookswitch 306′, release relay 208 is restored and pushbutton assembly 205 is in readiness for answering or originating another call.

IIC2. *Station S2′ transfers a call*

If a connection is established between regular station S2′ of line L2 and another line, the call may be transferred to the loudspeaking executive station unit S2 by replacing receiver 303′ on its hookswitch and then depressing answer pushbutton "A." Make contacts 3 of hookswitch 306′ open the operate and holding circuit of release relay 208 thereby permitting any pushbutton depressed to be retained in a depressed condition. The last-party release arrangement hereinbefore noted, maintains the hold magnets of the concerned selectors in their advanced position and line L2 is in the normal condition for answer. When the answer pushbutton is depressed, the operation of the apparatus of the executive station is as previously described for station S2 answering a call.

IID. *Conference calls*

A feature of the invention resides in an arrangement whereby a number of stations in the system may be connected together to permit conference calls to be conducted. A party on any line may call another line in the usual manner and request the answering party to call a third line, and thereafter request that the third party call still another line. This add-on conference calling may continue until all desired parties are connected together for a conference conversation.

Assuming line L1 has called line L2 in the usual manner, the connection established between the lines is maintained by selector unit SEL–1. Both hold magnet armatures of selector SEL–2 are operated from the ringing potential transmitted to line L2 during the ringing operation, and marginal armature 314′ is now held operated by the hereinbefore described mild flow of current. The called party at station S2′ (assuming the executive station S2 is not used) may operate the calling device 301′ in the usual manner to advance brush 318′ as pawl 322′ engages the teeth of rack 317′.

As the party at station S2′ dials the directory number of another line, stepping magnet 312′ is advanced step-by-step to a position corresponding to the called line. The first actuation of armature 316′ of stepping magnet 312′ restores the marginal armature 314′ of hold magnet 311′ as hereinbefore described. Armature 314′ is not immediately reoperated as the current flow through the winding of magnet 311′ is limited by resistor 305′.

Brush 318′ is advanced to the line multiple corresponding to the desired called line and the called line is tested to determine its busy or idle condition. If idle, the called line is signalled in the manner hereinbefore described and the party at station S2′ may converse with the called party. The conference-originating party at calling station S1 may also converse with the party called by station S2′. The second called party may then call still another party, and so on, until all desired lines are connected together for conference conversation.

A related feature resides in an arrangement whereby any called party may replace his receiver without disrupting the conference connection as the system is of the last-party release type. Thus, ground potential from other selector units maintains current flow through the hold magnet of the disconnected party.

III. SECOND EMBODIMENT (FIG. 4)

Figure 4:
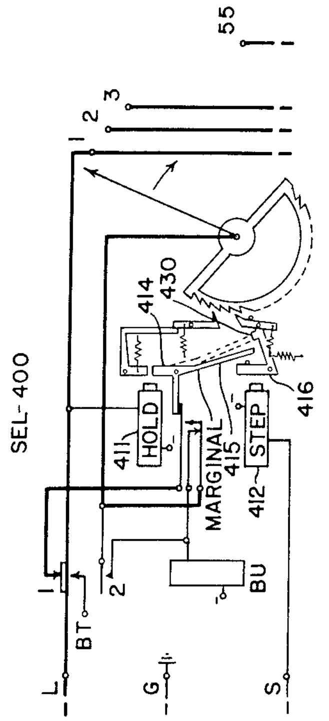
Figs. 4 and 5 show respective desirable modifications of the selectors of Fig. 3.

Referring now to Fig. 4, it will be observed that selector SEL–400 is generally similar to the selectors of Fig. 3. However, the marginal armature of the hold magnet of selector SEL–400 has been modified so that once actuated and held actuated by a mild flow of current, it prevents the actuation of the associated stepping magnet armature.

In its illustrated position the extended portion 415 of marginal armature 414 of hold magnet 411 is disposed so as not to interfere with the operation of armature 416 of stepping magnet 412. However, once actuated, armature 414 assumes a position, as shown by the dotted lines, whereby the extended portion 415 abuts the raised portion 430 of armature 416 and prevents its actuation. Therefore, once a connection is established normally and the desired called line is signalled, stepping magnet 412 is rendered ineffective. This arrangement prevents any abnormal operation of the ringing key or calling device from permitting connections to be established to busy lines.

This particular embodiment may be advantageously used in a system only where the hereinbefore described conference-call feature is not required, as the stepping magnet of any called line cannot be operated to call a third party.

IV. THIRD EMBODIMENT (FIG. 5)

Figure 5:
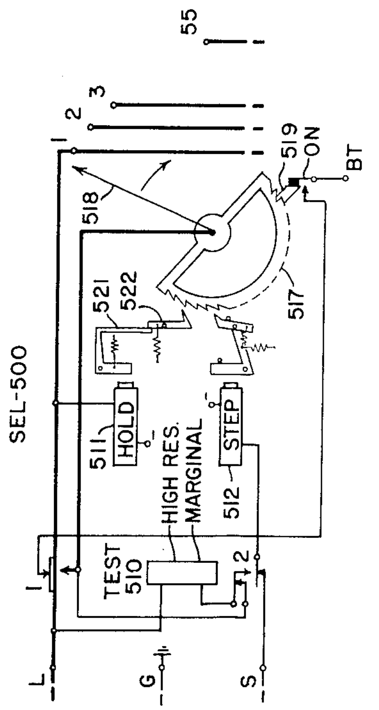

Referring now to Fig. 5, it will be observed that selector SEL–500 differs from the selectors of Figs. 3 and 4, in that the hold magnet of selector SEL–500 has only one armature and that a high-resistance test relay 510, replacing the busy relay of the other embodiments, eliminates the necessity for contacts associated with the hold magnet armature. However, conventional off-normal contacts are required on the stepping switch to control the application of busy-tone to the calling line.

When a call is originated over a line associated with selector SEL–500, the battery-connected winding of hold magnet 511 is energized from current flow through the associated transmitter circuit, as hereinbefore described. Its armature 521 and associated pawl 522 prepare selector SEL–500 for use.

Impulses transmitted over conductor S to the battery-connected winding of stepping magnet 512 cause brush 518 to advance across the bank contacts to the called line. Off-normal contacts 520, closed when finger 519 of rack 517 is moved from its illustrated position by the operation of magnet 512, apply busy-tone current to the calling line from common wire BT. Consequently, a busy tone is invariably present on the calling line after dialing and before operation of the ringing push button.

As hereinbefore pointed out, the switchboard multiple conductor of each line has thereon either an idle-indicating battery potential (through its hold magnet) or a guarding ground potential (through its transmitter circuit), depending on whether the concerned line is idle or is busy. The winding of high-resistance test relay 510 is connected between line wire L and brush 518. Therefore, as brush 518 contacts the line multiples of the switchboard, a current may flow through the winding relay 518 depending jointly on the potential on any contacted multiple conductor and the potential on conductor L of the calling line. Relay 510 never operates during dialing, as its indicated marginal adjustment prevents its operation except when nearly the full potential of the exchange battery is impressed across its winding terminals, which condition exists only when the ringing push button is operated at a time when brush 518 is standing on an idle called line.

After brush 518 has come into engagement with the bank multiple wire associated with the called line, the ringing button is depressed at the calling line to cause the called station to be signalled if the called line is idle.

When the ringing button is depressed, line conductor L is brought substantially to ground potential. If the called line is idle, the current flow through the winding of relay 510 is thereby increased to operating value. Relay 510 thereupon operates, and at its contacts 2 opens the stepping-magnet circuit and locks itself to battery through the winding of the stepping magnet, at the same time disconnecting itself from brush 518. Contacts 1 disconnect the calling line from the busy-tone wire and connect it through brush 518 to the called line. The push button ground on the calling line now appears on the called line to operate the marginal buzzer thereon. Stepping magnet 512 will not operate in series with the high-resistance winding of relay 510, but relay 510 remains operated after the ringing button is released, restoring when the connection is cleared out. If the called line is busy when called, marginal relay 510 fails to operate when the ringing button is depressed, and the presence of busy tone on the calling line after the ringing button is restored indicates that the called line is busy.

It will be noted that, while the busy relay of each of the other embodiments operates responsive to the called line being busy, test relay 510 of Fig. 5 operates responsive to the called line being idle.

A special feature of this arrangement is that test relay 510, since it must operate to connect the calling line to the brush 518 (and thence to the called line), being marginal, inherently cannot connect the calling line to a busy called line for the lack of a normal idle-indicating potential on the busy line. This method of operation renders unnecessary a second (marginal) armature on hold magnet 511, since the test relay itself responds to the operation of the ringing button to close the connection, subject to the called line being idle.

Since the operating circuit of test relay 510 includes brush 518, operation of the ringing button before dialing cannot prematurely operate the test relay to close the calling line with brush 518 as the brush is not contacting any line multiple; operation of the ringing button during dialing is ineffective because of off-normal contacts such as contacts 1 of calling device 301; and an attempt to connect with a busy line by first calling and connecting with a lower-numbered idle line, and then dialing a number equal to the difference between the line numbers, fails because test relay 510 disconnects stepping magnet 512 incidental to making connection with the idle line first called.

A further advantage flowing from the arrangement of Fig. 5 is that the winding of hold magnet 511 is not critical, for this hold magnet carries only a single, non-marginal armature. In the preceding embodiments, it will be recalled that the busy relay must operate in parallel with the hold magnet of a called busy line to bar a connection thereto. If a busy line is called by numerous parties, and several busy relays are held operated thereover at the same time, the current flow through their windings (in parallel with the hold magnet of the called busy line) may be so reduced that connections are established to the busy line. In order to prevent such an occurrence from invading the privacy of conversation over an established connection, the hold magnets are deliberately so wound as to be of low magnetic efficiency, whereby the hold armature (such as 321) of the concerned busy line is restored by the consequently reduced current flow through its hold magnet before enough lines have called the busy line to cause the busy relays of the calling lines to fail to operate. Restoration of the hold armature of an operated selector destroys the existing connection in order to preserve the secrecy of conversation thereover.

The rather drastic feature just detailed for Figs. 3 and 4 sharply limits the inductive impedance of the hold magnets, thereby increasing the voice-current loss. In the embodiment of Fig. 5, however, the described revised testing arrangement permits the hold magnets to have windings of high impedance, thereby improving the talking efficiency.

Unlike the selector of Fig. 4, the selector of Fig. 5 may be used in a system incorporating the described add-on conference calling arrangement, as the stepping magnet of the called line is not disabled until that line calls on idle third line and causes the test relay of its selector SEL–500 to operate as described.

It should be noted that the winding of test relay 510 is labelled "High resistance." It will be understood, of course, that this relay is also of high-inductive impedance whereby the passage of voice current therethrough is practically precluded, whereby a party calling a busy line (with relay 510 failing to operate, as described) cannot hear the conversation on the busy called line by virtue of the bridging connection between the calling line and the brush 518 through the high-impedance test relay.

Subject matter disclosed in this application is claimed in my divisional application for a Telephone with a Push-Button Impulse Sender, Serial No. 554,958, filed December 23, 1955.

I claim:

1. In an automatic intercommunicating telephone system, lines and switching devices individual thereto, respectively, means for operating any switching device over its individual line to extend a local connection to any desired called line, testing means operable in circuit with the local connection for determining and indicating that the local connection is extended to a busy called line, connecting means and means for operating it over the calling line either before or after said local connection is extended to the called line to connect the calling line to the local connection and to disable the testing means, means rendering the said operation of the connecting means dependent upon failure of the testing means to have indicated that the local connection has been extended to a busy called line, and means responsive to the operation of the said switching device to restore the said connecting means, if operated, whereby the calling line is disconnected from the local connection and the said disability of the testing means is terminated.

2. In an automatic intercommunicating telephone system, lines and switching devices individual thereto, respectively, means for operating any switching device over its individual line to extend a local connection to any desired called line, testing means operable in circuit with the local connection for determining and indicating that the local connection is extended to a busy called line, connecting means and means for operating it over the calling line either before or after said local connection is extended to the called line to connect the calling line to the local connection and to disable the testing means, means rendering the said operation of the connecting means dependent upon failure of the testing means to have indicated that the local connection has been extended to a busy called line, and means operable with the connecting means for preventing said switching device from being thereafter operated to extend a connection to a called line.

3. In an automatic intercommunicating telephone system, lines and switching devices individual thereto, respectively, means for operating any switching device over its individual line to extend a local connection to any desired called line, testing means operable in circuit with the local connection for determining and indicating that the local connection is extended to a busy called line, connecting means and means for operating it over the calling line either before or after said local connection is extended to the called line to connect the calling line to the local connection and to disable the testing means, means rendering the said operation of the connecting means dependent upon failure of the testing means to have indicated that the local connection has been extended to a busy called line, and armature-linkage means in said switching device for preventing such device from extending a connection to a called line at a time when the said testing means is disabled.

4. In an automatic intercommunicating telephone system, lines and switching devices respectively individual thereto, means including a calling device on any line for operating the associated switching device over its individual line to extend a local connection to any desired called one of said lines, means including a signalling device on the calling line and further including means in the associated switching device operable thereby over the calling line for connecting such line to the extended local connection, testing means for barring the said operation of the said connecting means if the last said local connection is extended to a busy called line, means for disabling said testing means incidental to the said operation of said connecting means, and means at least partially included in said connecting means for preventing the said operation of the last said switching device to extend a connection to a called line at a time when the said testing means is disabled.

5. In an automatic intercommunicating telephone system, lines and switching devices individual thereto respectively, means for operating any switching device over its associated line to extend a local connection to any desired called line, said devices being thereafter responsive to further control over the associated calling line to transfer the said local connection to a different called line, testing means for determining the idle or busy condition of the called line, connecting means operable to connect the calling line to the called line over the said local connection subject to the called line being idle, signalling means for operating the said connecting means and for thereafter signalling the called line subject to it being idle, the said testing means being disabled responsive to the operation of the said connecting means, and means operable responsive to the transfer of the said local connection to a different line subject to the said connecting means being operated to restore the said operated connecting means and to render the disabled testing means effective to test the last called line.

6. In an automatic intercommunicating telephone system, lines and switching devices individual thereto respectively, means for operating any switching device over its associated line to extend a local connection to any desired called line, said devices being thereafter responsive to further control over the calling line to transfer the said local connection to a different called line, testing means for determining the idle or busy condition of the called line, connecting means operable to connect the calling line to the called line over the said local connection subject to the called line being idle, signalling means for operating the said connecting means and for thereafter signalling the called line subject to it being idle, and means operable responsive to the operation of the said connecting means to prevent the transfer of a local connection thereafter.

7. In a stepping switch for extending a connection from a calling line to a desired called line, a brush and means including a stepping magnet for advancing it step-by-step into engagement with a desired called line, a connecting armature and means operable over the calling line for operating it to connect the calling line to the called line by way of said brush, the said stepping magnet including a reciprocable stepping armature for causing the said advance of the brush, and means responsive to an operation of said reciprocable armature for restoring said connecting armature, if operated.

8. In a stepping switch for extending a connection from a calling line to a desired called line, a brush and means including a stepping magnet for advancing it step-by-step into engagement with a desired called line, a connecting armature and means operable over the calling line for operating it to connect the calling line to the called line by way of said brush, the said stepping magnet including a reciprocable stepping armature for causing the said advance of the brush, and means responsive to the operation of the connecting armature for barring further effective operation of the stepping armature.

References Cited in the file of this patent

UNITED STATES PATENTS

| | | |
|---|---|---|
| 1,268,069 | Fales | May 28, 1918 |
| 1,381,195 | Ide | June 14, 1921 |
| 1,636,170 | Chaplin | July 19, 1927 |
| 2,194,051 | Muller | Mar. 19, 1940 |
| 2,218,328 | Curran et al. | Oct. 15, 1940 |
| 2,273,530 | King | Feb. 17, 1942 |